United States Patent Office 2,734,881
Patented Feb. 14, 1956

2,734,881

STABILIZED CHLORINE CONTAINING RESINS

Robert E. Lally, Bedford, and Raymond J. O'Hara, Maple Heights, Ohio, assignors to Ferro Corporation, Cleveland, Ohio, a corporation of Ohio No Drawing. Application September 18, 1951,
Serial No. 247,192

4 Claims. (Cl. 260—23)

This application is a continuation-in-part of our application Serial Number 192,832 filed October 28, 1950 and now abandoned.

This invention relates as indicated to chlorine containing vinyl resins which are resistant to the degradation effects of light and heat.

In general, chlorine, containing vinyl resins, such as, polyvinyl chloride, copolymers of vinyl chloride, etc. have very poor resistance to the effects of heat and/or light. It is well known to those skilled in the art that severe exposure, of the chlorine containing vinyl resins, to heat and/or light brings about discoloration, brittleness and loss of strength. This degradation is equally pronounced during the various fabrication processes as injection molding, calendering, etc.; operations which require heating of the plastic compositions.

It is, therefore, the principal object of the present invention to provide a composition of matter which when added to a chlorine containing vinyl resin causes the said resin to become substantially resistant to the degradation of heat and/or light.

A further object of the present invention is to provide stabilizing agents which are economical and easy to incorporate into the chlorine containing vinyl resins.

Other objects will appear as the description proceeds.

To the accomplishment of the foregoing and related ends, the invention then, comprises the features hereinafter fully described and particularly pointed out in the claims, the following description setting forth in detail certain illustrative embodiments of the invention, these being indicative, however, of but a few of the ways in which the principle of the invention may be employed.

We have found that such substances as aliphatic polyhydric alcohols, esters of aliphatic alcohols and ethers of aliphatic polyhydric alcohols when incorporated into chlorine containing vinyl resins show tendencies towards retarding the degradation effects of heat, however, while these substances show these tendencies they do not afford sufficient stabilization and therefore are not commercially acceptable. It is also known to those skilled in the art that various epoxy compounds when added to chlorine containing vinyl resins also show tendencies towards stabilizing these resins. However, here again, the stabilizing abilities of the epoxy compounds are of insufficient effect to be of any value.

We have found by combining these two aforementioned substances, which are of little value when used independently, a synergism is obtained which produces an outstanding stabilizer.

Broadly stated this invention comprises an admixture of from about 1 to about 5 parts of a compound selected from the class of aliphatic polyhydric alcohols having at least two and not more than nine hydroxyl groups and a boiling point of not less than 250° F., esters of aliphatic polyhydric alcohols, said esters having at least two and not more than nine hydroxyl groups and a boiling point of not less than 250° F. and ethers of aliphatic polyhydric alcohols, said ethers having at least two and not more than nine hydroxyl groups, and a boiling point not less than 250° F. and from about 1 to about 5 parts of an epoxy compound having a boiling point not less than 212° F.

From the foregoing broad statement it can be readily seen that the stabilizer of the present invention is an admixture of an aliphatic polyhydric compound and an epoxy compound. While neither of these substances alone is satisfactory as a stabilizing agent for chlorine containing vinyl resins, together they work synergistically to produce an outstanding stabilizer.

The following specific compounds are representative of the polyhydric compounds useful in the preparation of the stabilizers of the present invention:

Glycol
Glycerol
Sorbitol
Pentaerythritol
Glyceryl mono-stearate
Glyceryl mono-oleate
Glycol diethyl ether
Glyceryl monophenol ether Compounds containing one or more expoxide rings and having a boiling point not less than 212° F. will be found to be useful as the other component of the compositions of this invention. The term "organic epoxide" as used herein means an organic compound containing an olefin oxide group such as the structural group

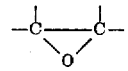

The following specific compounds are representative of those organic epoxide compounds having a boiling point not less than 212° F. which will be found particularly useful in the present invention:

Epichlorohydrin
Epihydrin alcohol
Dimethylglycidol
Phenylmethylglycidol
Styrene oxide
Pinene oxide The condensation product of bisphenol and epichlorohydrin Glycidylisopropylether
Glycidylphenylether Such compounds as epichlorohydrin having the structure

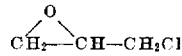

or the condensation product of bisphenol and epichlorohydrin having the following structure:

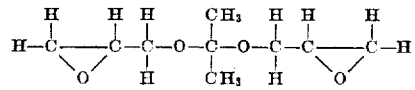

have been particularly useful because of their availability.

The organic epoxide compound and the polyhydric compound may be admixed in a ratio of 1:5 to a ratio of 5:1. However, in the preferred embodiment of our invention we use a ratio of one part of epoxy compound to one part of polyhydric compound. The total amount of stabilizer may range from about 0.5% to about 8.0% by weight of the vinyl resin.

The stabilizing agent may be incorporated into the chlorine containing vinyl resin by a number of methods. It may be added to the solid resin and mixed therein by means of hot rolls or other mixing machines adapted to mix solid resins. It may also be dissolved in a suitable solvent and then mixed with the resin, or the solution of the stabilizer may be mixed with a solution of the resin. The only important requisite is the stabilizer and resin are thoroughly mixed and dispersion is as complete as possible.

So that the synergistic effect of the combination of the polyhydric compound and the epoxy compound is more readily understood the following examples are given:

Example I

Standard compositions of 100 parts of polyvinyl chloride polymer and 47 parts of plasticizer (dioctylphthalate) were thoroughly mixed. To one such resin-plasticizer composition there was incorporated, 3% by weight on the resin content of epichlorohydrin; to a second batch of the same resin-plasticizer composition was added 3% by weight on the resin content of glycerol; and to a third batch of the same resin-plasticizer composition was added 3% by weight on the resin content of an admixture comprising 1 part epichlorohydrin and 1 part glycerol. The above mentioned ingredients were thoroughly incorporated into the resin-plasticizer mixes and then milled for 10 minutes on a hot-roll mill to obtain smooth films. These films were then subjected to a temperature of 300° F. and compared in stability by observing color changes over a period of 3 hours. The following results were noted:

A. The resin-plasticizer composition containing the glycerol alone turned black after 3 hours at 300° F.

B. The resin-plasticizer composition containing the epichlorohydrin turned dark brown after 3 hours at 300° F.

C. The resin-plasticizer composition containing both the epoxy compound and the polyhydric compound remained colorless after 3 hours at 300° F.

Example II

The same procedure as in Example I was followed, using epihydrin alcohol, glyceryl mono-stearate, and an admixture of 1 part epihydrin alcohol and 1 part glyceryl mono-stearate.

The following results were noted:

A. The resin-plasticizer composition containing the epihydrin alcohol turned brown after 3 hours at 300° F.

B. The resin-plasticizer composition containing the glyceryl monostearate turned dark amber after 3 hours at 300° F.

C. The resin-plasticizer composition containing the admixture of the epoxy and polyhydric compounds remained colorless after 3 hours at 300° F.

Example III

The same procedure as in Example I was followed again; using the condensation product of bisphenol and epichlorohydrin, pentaerythritol and an admixture comprising 1 part of the epoxy compound and 1 part of pentaerythritol.

The following results were noted:

A. The resin-plasticizer composition containing the condensation product of bisphenol and epichlorohydrin turned brown after 3 hours at 300° F.

B. The resin-plasticizer composition containing the pentaerythritol turned dark amber.

C. The resin-plasticizer composition containing the admixture of the epoxy and polyhydric compounds remained colorless after 3 hours at 300° F.

Duplicate tests were run using the same stabilizers with different chlorine containing vinyl resins. When such resins as vinyl chloride-vinyl ester copolymer, vinyl chloride-vinylidene copolymers were tested the stability tests were conducted for 1½ instead of 3 hours. This was done because it is well known to those skilled in the art that these latter resins do not withstand the effects of heat and/or light as readily as polyvinyl chloride resin.

The latter tests using the above mentioned resins gave results identical with the results given in the foregoing examples.

From the foregoing examples it can now be readily seen that a striking example of synergism is shown. Two relatively poor stabilizers when combined produce an unexpectedly outstanding stabilizer.

The stabilizers of this invention can be incorporated into chlorine containing vinyl resins alone or in conjunction with pigments, dyes, fillers, etc.

Other modes of applying the principle of the invention may be employed, change being made as regards the details described, provided the features stated in any of the following claims or the equivalent of such be employed.

We, therefore, particularly point out and distinctly claim as our invention:

1. A composition of matter comprising a chlorine containing vinyl resin and from about 0.5% to about 8.0% by weight, based on said resin, of a stabilizer, said stabilizer comprising an admixture of from about 1 to about 5 parts of an epoxy compound having a boiling point not less than 212° F. and from about 1 to about 5 parts of a compound selected from the class consisting of aliphatic polyhydric alcohols having at least two and not more than nine hydroxyl groups and a boiling point not less than 250° F., esters of aliphatic polyhydric alcohols said esters having at least two and not more than nine hydroxyl groups and a boiling point not less than 250° F., and ethers of aliphatic polyhydric alcohols said ethers having at least two and not more than nine hydroxyl groups and a boiling point not less than 250° F.

2. A composition of matter comprising a chlorine containing vinyl resin and a stabilizer, said stabilizer comprising from about 1 to about 5 parts of glycerol and from about 1 to about 5 parts of epichlorohydrin.

3. A composition of matter comprising a chlorine containing vinyl resin and from about 0.5% to about 8.0% by weight, based on said resin, of a stabilizer, said stabilizer comprising from about 1 to about 5 parts of glyceryl mono-stearate and from about 1 to about 5 parts of ephydrin alcohol.

4. A composition of matter comprising a chlorine containing vinyl resin and from about 0.5% to about 8.0% by weight, based on said resin, of a stabilizer, said stabilizer comprising from about 1 to about 5 parts of pentaerythritol and from about 1 to about 5 parts of the condensation product of bisphenol and epichlorohydrin.

References Cited in the file of this patent

UNITED STATES PATENTS

| | | |
|---|---|---|
| 2,500,449 | Bradley | Mar. 14, 1950 |
| 2,581,464 | Zech | Jan. 8, 1952 |
| 2,592,560 | Greenlee | Apr. 15, 1952 |

UNITED STATES PATENT OFFICE

Certificate of Correction

Patent No. 2,734,881

February 14, 1956

Robert E. Lally et al.

It is hereby certified that error appears in the printed specification of the above numbered patent requiring correction and that the said Letters Patent should read as corrected below.

Column 2, lines 55 to 58, the structural formula should appear as shown below instead of as in the patent—

Signed and sealed this 1st day of September 1959.

[SEAL]

Attest:
KARL H. AXLINE,
*Attesting Officer.*

ROBERT C. WATSON,
*Commissioner of Patents.*